(12) United States Patent (10) Patent No.: US 12,462,237 B2
Chasney (45) Date of Patent: Nov. 4, 2025

(54) REMOTE ORDER-TAKING SYSTEM

(71) Applicant: Jeffrey Chasney, Sarasota, FL (US)

(72) Inventor: Jeffrey Chasney, Sarasota, FL (US)

( * ) Notice: Subject to any disclaimer, the term of this patent is extended or adjusted under 35 U.S.C. 154(b) by 0 days.

(21) Appl. No.: 18/784,561

(22) Filed: Jul. 25, 2024

(65) Prior Publication Data

US 2025/0307794 A1 Oct. 2, 2025

Related U.S. Application Data

(60) Provisional application No. 63/571,173, filed on Mar. 28, 2024.

(51) Int. Cl.
*G06Q 20/20* (2012.01)
*G06Q 30/0601* (2023.01)
*G06Q 50/12* (2012.01)

(52) U.S. Cl.
CPC ......... *G06Q 20/20* (2013.01); *G06Q 30/0641* (2013.01); *G06Q 50/12* (2013.01)

(58) Field of Classification Search
CPC ..... G06Q 20/20; G06Q 30/0641; G06Q 50/12
See application file for complete search history.

(56) References Cited

U.S. PATENT DOCUMENTS

| 6,994,252 B2 * | 2/2006 | Frich | G06K 17/00 |
| | | | 705/16 |
| 2007/0007331 A1 * | 1/2007 | Jasper | G07G 1/14 |
| | | | 235/379 |
| 2008/0222004 A1 * | 9/2008 | Pollock | G06Q 30/0613 |
| | | | 705/15 |
| 2019/0122665 A1 * | 4/2019 | Chasney | G10L 15/22 |
| 2022/0129876 A1 * | 4/2022 | Fernando | G06F 3/0487 |

* cited by examiner

*Primary Examiner* — A. Hunter Wilder
(74) *Attorney, Agent, or Firm* — Holzer Patel Drennan

(57) ABSTRACT

A remote service device may provide, to a remote ordering system via a network, access to subsystems of a client computing system, the remote service device being communicatively coupled to the subsystems at the location via corresponding hardware interface channels. A remote service device may communicate, to the client computing system via one or more of the hardware interface channels, a command received from the remote ordering system.

20 Claims, 8 Drawing Sheets

700

Provide, to a remote ordering system via a network, access to one or more subsystems of a client computing system using a remote service device, the remote service device being communicatively coupled to the one or more subsystems at the location via corresponding hardware interface channels
702

Communicate, using the remote service device to the client computing system via one or more of the hardware interface channels, a command received from the remote ordering system
704

FIG. 7

REMOTE ORDER-TAKING SYSTEM

CROSS-REFERENCE TO RELATED APPLICATION

This application claims priority to U.S. Provisional Application No. 63/571,173, filed Mar. 28, 2024, and entitled, "Remote Order-Taking System." The above-referenced patent application is specifically incorporated herein for all that it discloses and teaches.

BACKGROUND

In conventional order-taking systems for quick service merchants, on-site personnel at a merchant location (e.g., a drive-through location) receive a customer's order via a drive-through ordering lane. For example, the customer proceeds through a drive-through lane and approaches the Order "Post," which has a speaker and microphone. This order post location may be located behind, beside, or in front of the restaurant itself. Upon hearing the customer's order spoken from the order post, the on-site personnel then enter the customer's order into a point of sale (POS) system at the merchant location. The merchant's POS system, in some instances, provides order information (e.g., order and/or preparation instructions for a kitchen ordering system) to other merchant systems at the location to assist in the prompt preparation of the goods or services being provided to the customer.

SUMMARY

In some aspects, the techniques described herein relate to a method for remote order taking at a location, including: providing, to a remote ordering system via a network, access to subsystems of a client computing system using a remote service device, the remote service device being communicatively coupled to the subsystems at the location via corresponding hardware interface channels; and communicating, using the remote service device to the client computing system via one or more of the hardware interface channels, a command received from the remote ordering system.

In some aspects, the techniques described herein relate to one or more tangible processor-readable storage media embodied with instructions for executing on one or more processors and circuits of a system a process for remote order taking at a location, the process including: providing, to a remote ordering system via a network, access to one or more subsystems of a client computing system using a remote service device, the remote service device being communicatively coupled to the one or more subsystems at the location via hardware interface channels; and communicating, using the remote service device to the client computing system via one or more of the hardware interface channels, a command received from the remote ordering system.

In some aspects, the techniques described herein relate to a remote service device for remote order taking at a location, the remote service device including: one or more hardware processors; hardware interface channels communicatively coupled to one or more subsystems of a client computing system at a location; a client communication interface executable by the one or more hardware processors and configured to receive data of the one or more subsystems via the hardware interface channels; and a remote communication interface executable by the one or more hardware processors and configured to: provide, to a remote ordering system via a network, access to data of the one or more subsystems received via the hardware interface channels; and receive, from the remote ordering system via the network, a command, the client communication interface further configured to communicate, to the client computing system via one or more of the hardware interface channels, the command.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 7 illustrates an example method for remote order taking.

DETAILED DESCRIPTIONS

Figure 1:
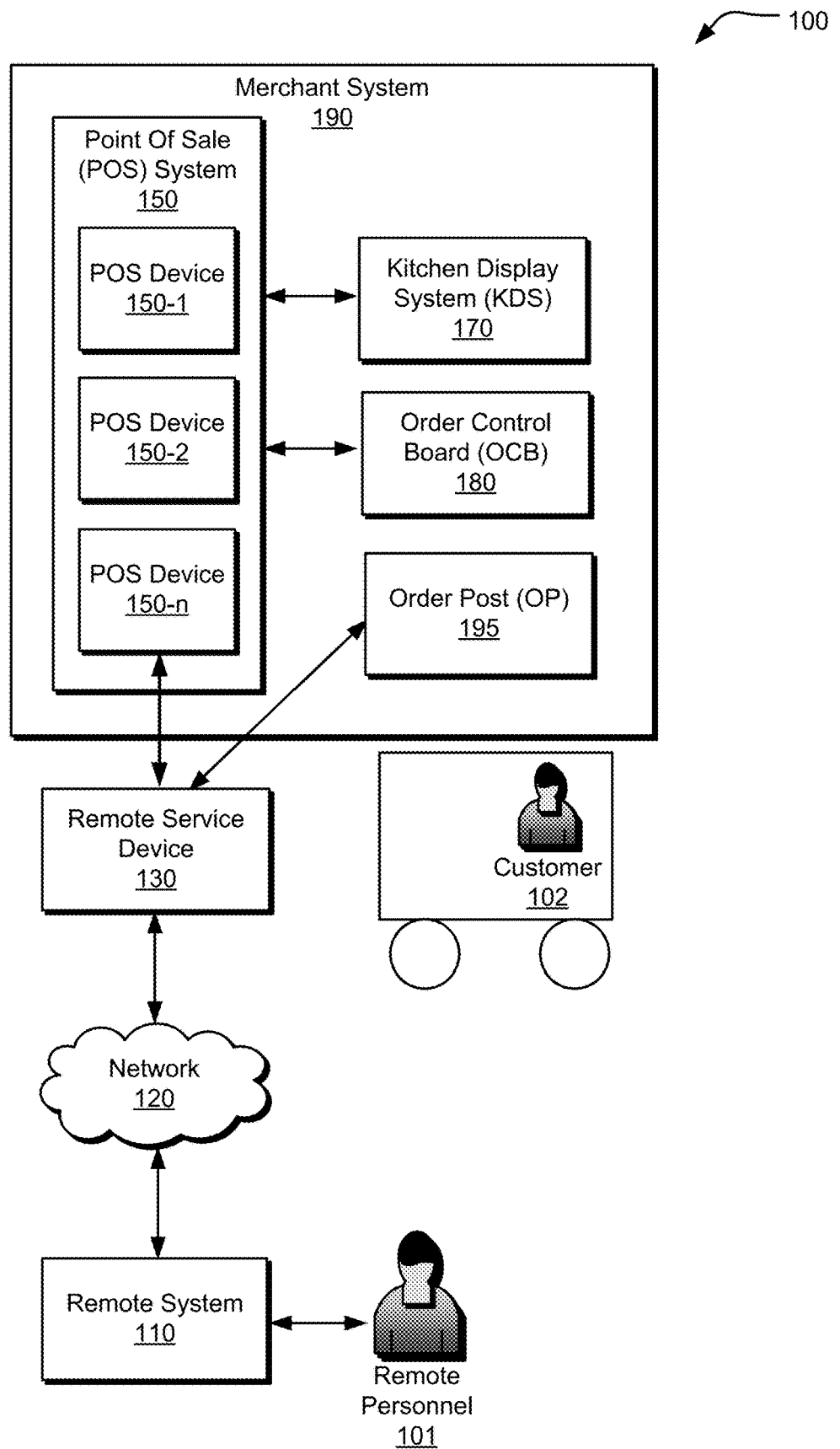
FIG. 1 depicts a computing environment for remote order-taking.

In some instances (e.g., during a pandemic, or if a location is otherwise understaffed), having personnel for on-site customer order-taking is not feasible. Conventional solutions for online order-taking enable personnel at a location other than the merchant location (e.g., at a remote location) to perform order-taking tasks. There are presently solutions that require software integration with a merchant's point-of-sale system. However, such software-integration-based solutions are not feasible for use with multiple merchant systems with varying POS operating systems because each separate software integration is a costly and time-consuming undertaking.

The disclosed technology permits a hardware-based integration of a remote system with a location merchant location to enable remote entry of customer orders directly into the merchant's on-site POS system. This disclosed technology includes a remote service device installed at a merchant location that enables remote control of POS terminals and other merchant hardware (e.g., order post, kitchen display system, and other devices) at the merchant location, via hardware interfaces of the device with one or more on-site merchant systems. For example, the remote service device of the technology disclosed herein enables remote personnel to access the order post at the merchant location and listen to and respond to customer orders via voice communication, enter received orders directly into the POS system at the merchant location. Personnel at the merchant location (e.g., kitchen personnel) operate the merchant location normally except the order information is taken via remote personnel that enter order information directly into the merchant's POS system for on-site personnel to access. Accordingly, the disclosed technology permits remote entry of the order (e.g., received from the customer at the order post) just as if the remote order-taker were on-premises at the service location and entering the order directly on the POS terminal.

In some implementations, the remote system operated by remote personnel communicates with the remote service device that is locally connected to the merchant's on-site POS system and other merchant systems and processes (e.g., including drive-through order confirmation boards and kitchen display systems) remain intact and operate normally in real-time by interfacing with the remote service device or with the POS system to which the remote service device is communicatively coupled. In the disclosed technology, except for the remote service device enabling remote control of merchant systems by remote personnel via a network, the standard operation of merchant systems remains intact and identical to the operation of such facilities when on-premises personnel otherwise enter orders. The remote service device of the disclosed technology is easily installed, off the shelf, to interface with merchant systems that operate any type of software or operating system. This invention is "agnostic" to the POS systems deployed in different restaurants and requires no integration effort for the different POS software solutions nor the different POS hardware terminals. On the other hand, conventional software-based integration approaches may require extensive programming so that remote software systems are compatible with merchant on-site software/operating systems.

FIG. 1 depicts a computing environment 100 for remote order taking. The example computing environment 100 includes a remote system 110, a remote service device 130, and a merchant system 190. The remote system 110 is operated by remote personnel 101 and communicates with the remote service device 130 via a network 120 (e.g., an IP network). The remote service device 130 is communicatively coupled with a point of sale (POS) system 150 of the merchant system 190 via hardware interfaces (e.g., USB, Serial, Video interface, etc.) of a POS terminal (e.g., POS device 150-n) of the POS system 150. The hardware interfaces are separate from the network 120 via which the remote service device 130 communicates with the remote system 110.

As depicted in FIG. 1, the remote service device 130 communicates with a POS device (e.g., POS device 150-n) of the POS system 150 and the POS system 150 is integrated, with other subsystems of the merchant system 190. For example, the POS system 150 includes multiple POS devices (e.g., n number of POS devices including POS device 150-1, POS device 150-2, . . . . POS device 150-n) and communicates with a kitchen display system (KDS) 170 and with an order confirmation board (OCB) 180. For example, a POS device may be a POS terminal. As depicted in FIG. 1, the remote service device 130 communicates with an order post (OP) 195. The architecture of the merchant system 190 depicted in FIG. 1, which includes the POS system 150 that communicates with the KDS 170 and OCB 180 as indicated in FIG. 1, is an example. In some implementations, the merchant system 190 can have a different computing environment (e.g., a different system architecture including a different arrangement of devices and communication flow between devices) than the example computing environment 100 depicted in FIG. 1.

The remote service device 130 can be configured to enable remote control, via hardware interface connections, of one or more merchant devices (e.g., one or more of the POS devices, the KDS 170, the OCB 180, or the order post 195) within the merchant system 190. In some implementations, the merchant system 190 may include a hub device that communicates with the POS devices of the POS system 150, the KDS 170, and the OCB 180. In these implementations, the remote service device 130 communicates with the hub device via a hardware interface connection and can control, via the hub device, the one or more devices (e.g., one or more POS devices, the KDS 170, the OCB 180, or the order post 195) of the merchant system 190 by controlling the hub device.

The remote service device 130 uses hardware interfaces to integrate with one or more devices of the merchant system 190 (e.g., direct integration with a POS device 150-1 (e.g., POS terminal) of the in-store POS system 150, direct integration with the order post 195, etc.). These devices to which the remote service device 130 is connected via hardware interfaces may themselves already be integrated with and already be able to communicate with other devices of the merchant system 190 (e.g., with wireless headsets, drive-through car sensors, KDS 170, and OCB 180). The remote service device 130 may be installed easily and may be configured to integrate with virtually any brand of POS terminal (e.g., PC-based, or other operating-system-based POS terminal) or other merchant hardware device, thereby making the system completely POS-agnostic and POS system operating system/software agnostic.

In some implementations, installation of the remote service device 130 of the disclosed technology requires no software integration work by POS providers as it does not significantly change the existing in-store technology. In some implementations, the system of the disclosed technology functions with all major vendors/providers of POS solutions and drive-through communication facilities. In some implementations, the remote service device 130 of the disclosed technology automatically integrates (e.g., off the shelf and with minimal installation steps required) with all POS systems (e.g., the POS system 150) regardless of the PC operating system that hosts the POS software resident on POS devices of the POS system 150.

In some implementations, the remote service device 130 uses Peer-to-Peer (P2P) telecommunications to communicate with the remote system 110 operated by remote personnel 101 (e.g., a remote order-taking agent). In some implementations, a "Dispatcher" subsystem (e.g., an internal system of the remote system 110) identifies and connects appropriate remote personnel 101 to each merchant location for the duration of an order. The Dispatcher may be either a cloud-based Web Service or non-Cloud based Web Service. In some instances, the identification and connections are performed based on online availability of the remote personnel 101, and one or more other factors (e.g., merchant-desired characteristics such as brand, POS fluency, multilingual match of the remote personnel 101, etc.). Accordingly, the described technology provides an infinitely scalable solution without requiring server additions, load balancing, and so forth.

Aspects of the computing environment 100 not specifically described with respect to FIG. 1 may be the same or similar to other implementations described herein.

Figure 2:
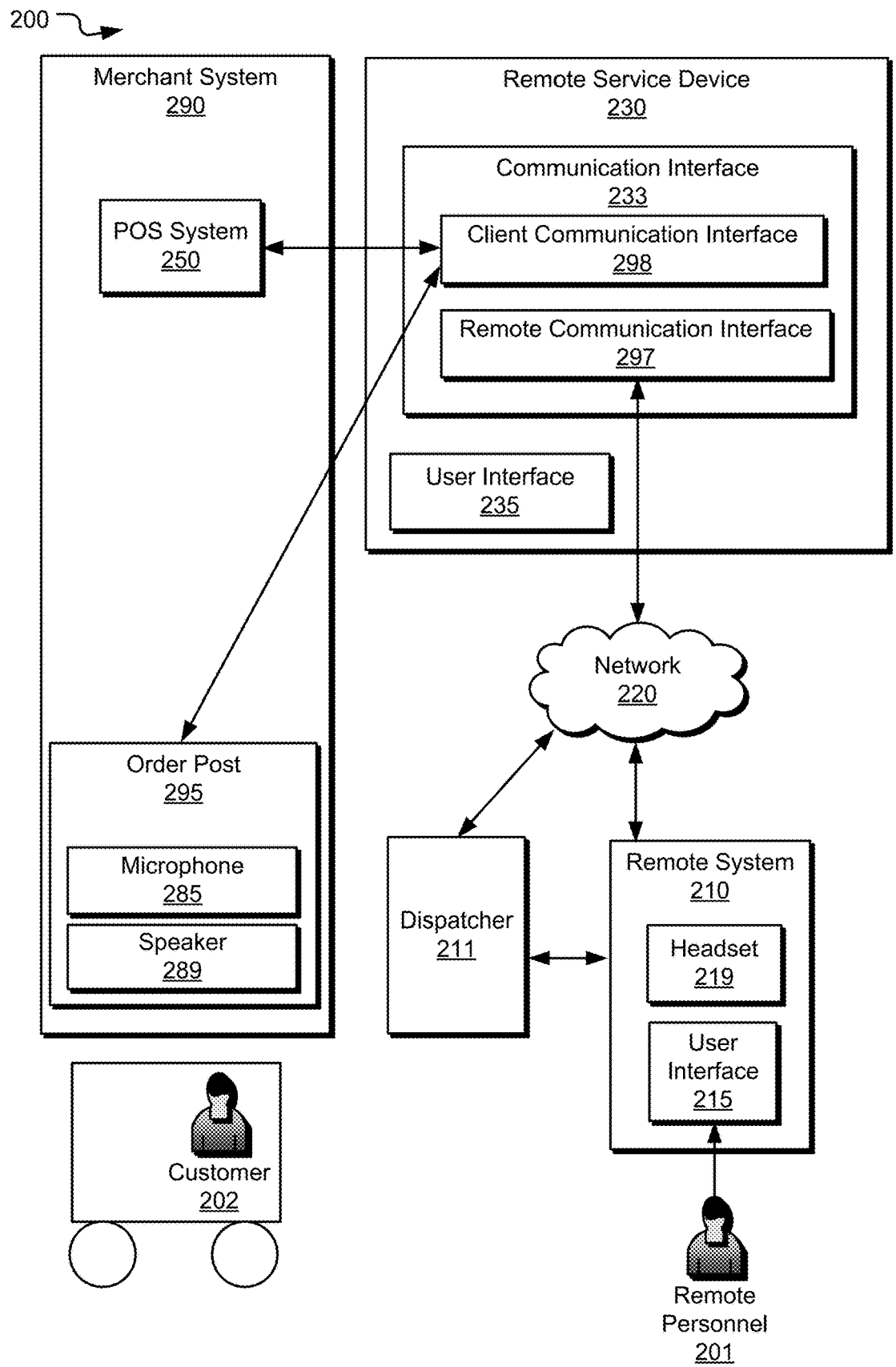
FIG. 2 depicts a computing environment for remote order-taking.

FIG. 2 depicts a computing environment 200 for remote order taking. Aspects of the computing environment 200 not specifically described with respect to FIG. 2 may be the same or similar to other implementations described herein.

The example computing environment 200 includes a remote system 210, a remote service device 230, and a merchant system 290. The remote system 210 is operated by remote personnel 201 and communicates with the remote service device 230 via a network 120 (e.g., an IP network). The remote service device 230 is coupled via hardware interfaces (e.g., a USB hardware interface, a serial hardware interface, a video hardware interface, etc.) with a point of sale (POS) system 250 of the merchant system 290 (e.g. coupled to one or more individual POS devices of the POS system 250 or to other merchant hardware of the merchant system 290, for example, to an order post) via a hardware interface connection that is separate from the network via which the remote service device 230 communicates with the remote system 210. The POS system 250 is integrated with other merchant system 290 subsystems, for example, a KDS and an OCB.

The remote system 210 includes a headset 219 device that includes a microphone and a speaker. Remote personnel 201 may provide voice input to and receive audio output from the remote system 210 via the headset 219 device. The remote system 210 includes a user interface 215 so that the remote personnel 201 may interact, via the remote service device 230, with the user interface functionality of one or more POS terminals of the POS system 250 (or other merchant hardware such as the order post 295). The remote system 210 also communicates with a dispatcher 211 that routes orders received at one or more merchant systems 290 to specific remote personnel 201 of a plurality of remote personnel (e.g., the remote personnel 201).

In some implementations, the remote service device 230 is operable in multiple operating modes and communicates with a corresponding computing device of the remote system 110 used by remote personnel 101. For example, the remote service device 230 can be operated in a "Dedicated Agent" operating mode. In this operating mode, a single remote personnel 101 is dedicated to taking drive-through orders for a specific merchant system 190.

Another example operating mode is a "Dispatched Agent" operating mode. In this operating mode, a pool of remote personnel (e.g., the remote personnel 201) are employed by the remote system 110 and they are dispatched by a dispatcher 211 component to service drive-through customers (e.g., customer 102) from several different restaurants. For example, the pool of remote personnel includes one or more remote order-taking agents. The dispatcher 211 is notified by the remote service device 230 that a drive-through customer (e.g., customer 202) has arrived. The dispatcher 211 finds the next available remote personnel 201 in its internal queue and links that remote personnel 201 to the merchant system 290 (e.g., to the POS system 250, and to the order post 295)) for the duration of that single order. Once that customer 202 order is completed, the remote personnel 201 is returned to the queue of available agents for dispatch by the dispatcher 211 to any other restaurant customers.

In some implementations, the order post 295 includes a microphone 285, and a speaker 289. During an order, a customer (e.g., customer 202) can provide voice input to the order post 295 via the microphone 285. The voice input is received by the remote service device 230 and transmitted via the network 220 to the remote system 210. The remote system 210 outputs the customer's voice input to the remote personnel 201. The remote system 210 can receive voice input of the voice personnel 201 (e.g., via the headset 219) and transmit the voice input of the remote personnel 201 via the network 220 to the remote service device 230, which forwards the voice input to the order post 295 to output the voice input to the customer 202 via the speaker 289.

In some implementations, installing the remote service device 230 at the merchant system 290 location involves configuring system administration functions for a particular installation that are not part of the day-to-day operational system. Such system administration functions can include a setup of new remote personnel (e.g., remote personnel 201), a setup of new restaurants, and providing general statistical reports. The setup of new remote personnel may include one or more of assigning a name and password to each new remote personnel, designating which brands may be serviced by each remote personnel, or defining particular characteristics of the remote personnel (e.g., speaks English, speaks Spanish, is fluent with a particular POS operating system or specific POS software, etc.). The setup of new restaurants may include one or more of assigning a merchant ID (e.g., restaurant ID) to each merchant location, designating the brand affiliation of the merchant assigning required remote personnel characteristics (e.g., must have fluency with a particular POS operating system and/or POS software), or assigning "preferred" remote personnel characteristics (e.g., English/Spanish bilingual). Providing general statistical reports may include generating remote personnel reports noting one or more of a number of orders taken, an average order time, a number of order requests not accepted, or a number of orders abandoned. Providing general statistical reports may include generating merchant location reports noting one or more of a number of orders taken or an average order time.

The remote service device 230 operates at the location of the merchant system 290. The remote service device 230 performs software functions to control hardware interfaces, internet interfaces, and process sequencing with the merchant system 290. In some implementations, the hardware components of the remote service device 230 can be housed within an enclosure that exposes connectors and wires that must be interfaced to one or more of the external POS terminals of the merchant POS system 250, a drive-through wireless headset station, the network 220 (e.g., the internet), or other hardware components of the merchant system 290.

In some instances, the remote service device 230 includes a user interface 235 (e.g., a touchscreen interface) that displays current state information and permits a user (e.g., staff at the merchant system 290 location) to activate or deactivate, via one or more inputs to the user interface 235, the remote order-taking service that is provided by the remote service device 230.

The remote service device 230 includes a communication interface 233. The communication interface 233 includes a remote communication interface 297 for communicating via the network 220 with the remote system 210 (e.g., communicating with remote personnel 201 operating a computing device of the remote system 210) and includes a client communication interface 298 for communicating with the POS system 250 (and, in some implementations, with the order post 295) of the merchant system 290.

Both the remote service device 230 and the remote system 210 may also perform audio processing to improve the quality of the audio received from the customer 202 (e.g., via the order post 295) and delivered to the customer (e.g., also via the order post 295). Such processing could include noise suppression, audio volume leveling, and feedback/echo cancellation.

In some implementations, in the event of a network 220 outage or if the remote service device 230 is unable to communicate with the remote ordering system 210, the staff of the merchant system 290 may perform local order-taking at the merchant system 290 location directly using the POS system 250. In this example network 220 outage event, the speaker 289 and the microphone 285 of the order post 295 remain usable by local restaurant workers via their normal restaurant headset devices.

The dispatcher 211 can keep track of available remote personnel (e.g., remote personnel 201) and assign them to specific nodes (e.g., specific merchant system 290 communicatively coupled to respective remote service device 230) that have customers (e.g., customer 202) awaiting service.

The dispatcher 211 accepts requests from the remote service device 230 for remote personnel 201 service. Dispatcher 211 then finds an available remote personnel 201 that satisfies any merchant system 290 requirements (e.g., brand, POS system fluency, language, etc.) and must then reply to the remote service device 230 with the AgentID and IPAddress associated with a computing device of the remote personnel 201 on the remote system 210. The remote service device 230 can then initiate direct peer-to-peer communication with the computing device of the remote personnel 201 for the duration of the associated order. Once the order is completed, the remote service device 230 and the remote system 110 operated by the remote personnel 201 notify dispatcher 211 that servicing of the order is complete. Dispatcher 211 then changes the state of the associated remote personnel 201 from "InUse" to "Available" and will add the remote personnel 201 to the tail of the "Available Agents" queue, ready to service other requests.

The dispatcher 211 can be configured as a TCP/IP application or as a web service. Dispatcher 211 is an intermediary between the remote service device 230 in each merchant system (e.g., in each restaurant/store, for example in merchant system 290) and the remote personnel 201 that may be dispersed at locations remote from a location of the merchant system 290 (e.g., worldwide).

The dispatcher 211 accepts requests from both "Node" remote service device endpoints (e.g., remote service device 230 and remote service devices at various other merchant system locations) and from remote personnel 201 ("Agent") endpoints and will respond to each request promptly.

The dispatcher 211 may handle a variety of commands. For example, a "service active" command may be sent from a particular node (e.g., remote service device at store or merchant location) to the dispatcher 211 notifying the dispatcher 211 that the node is now using remote services and this command associates the node with a current IP address of the node. A "service inactive" command may be sent from the node to the dispatcher 211 notifying the dispatcher 211 that the node has discontinued using remote services. An "acquire agent" command may be sent from the node to the dispatcher 211 notifying the dispatcher 211 that a customer is in the drive-through and the node needs a remote agent to service the customer. A "release agent" command may be sent from the node to the dispatcher 211 notifying the dispatcher 211 that the customer has departed the drive-through. The release agent command may further notify the dispatcher 211 that the agent has completed the service and can now be returned to the queue for other work. A "cancel agent" command may be sent from the node to the dispatcher 211 notifying the dispatcher 211 of one or more of the following events: (1) the agent canceled the current order-taking, (2) the node has lost connection with the agent, or (3) the agent did not accept a start order request. In some implementations, responsive to receiving the cancel agent command, the dispatcher 211 logs the event and changes the status of the agent to "unavailable." A "second agent" command may be sent from the node to the dispatcher 211. The second agent command may be similar to the cancel agent command described above except that, in addition to the dispatcher 211 logging the event and making the currently assigned agent "unavailable," the dispatcher 211 also will search for the next suitable agent and return such to the requester node if found. An "available" command may be sent from the agent station when the agent (e.g., remote personnel) is available for order taking. An "unavailable" command may be sent from the agent station when the agent is unavailable for order taking.

The dispatcher 211 may use database tables to organize node (e.g., remote service device 230 at merchant/restaurant system) and agent (e.g., remote personnel) information and to track their present state. Database tables may also be used as "FIFO Queues" to prioritize the assignment of Agents to Node requests according to first-in-first-out rules. The following are possible database table definitions that could be used.

For example, a node information table definition includes a set of node IDs (e.g., "1100588") that are each associated with a password (e.g., "Qwedfrl@"), a brand ID (e.g., "Merchant A"), and a present state (e.g., "inactive."). For example, a characteristics table definition includes a set of characteristic IDs associated with names (e.g., "001: Brand, 002: POS, 003: Language, 004: Gender."). For example, a node requirements table definition includes a set of node/store IDs that are each associated with a brand ID, a characteristic ID, and a value (e.g., rows "1100588/Merchant A/002/Brink" and "1100588/Merchant A/003/English"). For example, a node preferences table definition includes a set of node/store IDs that are each associated with a brand ID, a characteristic ID, and a value (e.g., rows "1100588/Merchant A/002/Spanish" and "1100588/Merchant A/004/Female"). For example, an agent information table definition includes a set of agent IDs that are each associated with a password, an agent name, and a present state (e.g., "Agent ID: 0001," "Password: ABDEFT657!," "Agent Name: Jim Smith," and "Present State: Inactive"). For example, an agent characteristics table definition includes a set of agent IDs that are each associated with a characteristic ID and a characteristic value (e.g., "1100588/001/Merchant A," "1100588/001/Merchant B," "1100588/002/Merchant C," "1100588/003/English").

In some implementations, an administration module manages the merchant system 290, and agent information is managed via an administration application. The user of the remote service device 230 may create, edit, or delete entries in both the merchant system 290 database tables and in the database agent tables via a web or client-server application.

The dispatcher 211 may be presented as a TCP/IP service or as a Web Service to the remote service device 230. Information may be transmitted between remote service device 230, the agent, and the dispatcher 211 using standard JSON key=value format. One or more Application Program Interface (API) services may be implemented as a library for use within the remote service device 230 and remote system 210 application programs.

For example, a "Service Active" API call may be made from a node (e.g., remote service device 230) to the dispatcher 211. It is used to inform the dispatcher 211 that the node will now begin using remote system 210 services. The dispatcher 211, in some implementations, simply logs the date/time of the event, stores the IP_address of the node for future reference, and responds to the TCP/IP request with success if the NodeID is valid. If NodeID is invalid, then this service responds with NAK. An example message format for the Service Active API call is the following format: Source=Node, Command=ServiceActive, NodeID=xxxxxxx. An example response format for the Service Active API call is the format: ACK=command successfully executed by Dispatcher 211/NAK=error occurred in processing the request.

An example "Service Active" API call may be made from a node (e.g., remote service device 230) to the dispatcher 211. is the Service Active API call may be used to inform the dispatcher 211 that the node will discontinue use of remote system 210 services. In some implementations, the dispatcher 211 simply logs the date/time of the event and responds to the TCP/IP request with success if the NodeID is valid. If NodeID is invalid, then this service responds with NAK. An example message format for the Service Active API call is of the following format: Source=Node, Command=ServiceInactive, NodeID=xxxxxxx. An example response format for the Service Active API call is of the format: ACK=command successfully executed by Dispatcher/NAK=error occurred in processing the request.

An example "Acquire Agent" API call is made from the node (e.g., remote service device 230) to dispatcher 211. This call is made by remote service device 230 when they require the service of an available agent (e.g., remote personnel 201) to handle an order. The dispatcher 211 authenticates the node by accessing its table of Node_ID/IP_address table to ensure that the Node is "Active" and that its IP Address is known from when the Node activated against the current IP address of the command received. In some implementations, if the node is validated, the dispatcher 211 then attempts to identify an available agent that meets the requirements and preferences of the requesting node. In some implementations, a suitable agent must have the characteristics that are specified (e.g., designated as "Required") by the node. "Preferred" characteristics of the node are then used to prioritize use of available agents that possess the greatest number of preferred characteristics over those agents lacking preferred characteristics. An example message format for the Acquire Agent API call is of the format: Source=Node, Command=AcquireAgent. When the dispatcher 211 is able to authenticate the requesting node and is able to find an available that fulfills the requirements of the node, then the following response is sent to node: ACK, AgentID=iiiiiiiiiiiiii, IP=xxx.xx.xx.xxx, Name=nnnnnnnnn. In some implementations, if the node is not authenticated or a suitable agent is not available, then the node responds with the following response: (NAK with message format: Source=Node, Command=AcquireAgent, and response format: ACK, AgentID=Agent1245, IP=100.88.101.146, Name="John Smith").

An example "Release Agent" API call is made from the node (e.g., remote service device 230) to the dispatcher 211. The Release Agent API call is made by the remote service device 230 when the service by the currently assigned agent (e.g., remote personnel 201) has been concluded and service is no longer required. In some implementations, upon receiving the Release Agent command, the dispatcher 211 authenticates the node and, if authentic, then the agent is removed from the in-service queue and is added to the bottom of the FIFO Available Agents queue so that they can be assigned to new requests. An example message format for the Release Agent API call is: Source=Node, Command=ReleaseAgent. An example response format for the Release Agent API call is: ACK=command successfully executed by Dispatcher/NAK=error occurred in processing the request.

An example "Cancel Agent" API call is made from the node (e.g., remote service device 230) to the dispatcher 211. The Cancel Agent API call occurs when the node is not able to connect with the agent (e.g., remote personnel 201) returned by dispatcher 211 from a preceding AcquireAgent API call. It is also issued by the node if the agent cancels an in-stream order or if the node loses the TCP/IP connection with the agent in the middle of the order. Upon receiving this command, the dispatcher 211 marks the currently assigned agent as "Inactive" thereby removing them as candidates for future requests. An example message format for the Cancel Agent API call is: Source=Node, Command=CancelAgent and an example response format for the Cancel Agent API call is: ACK=command successfully executed by Dispatcher/NAK=error occurred in processing the request.

An example "Second Agent" API call is made from the node (e.g., remote service device 230) to the dispatcher 211. This call occurs when remote service device 230 is not able to connect with the agent returned by dispatcher 211 from a previous AcquireAgent API call. The dispatcher 211 authenticates the node by accessing its table of Node_ID/IP_address table to ensure that the node is "Active" and that the IP Address of the node is known from when the node activated against the current IP address of the command received. If the Node is validated, dispatcher 211 marks any currently assigned agent as "Inactive" thereby removing them as candidates for future requests. The dispatcher 211 then attempts to identify an available agent (e.g., remote personnel 201) that meets the requirements and preferences of the requesting node. In some implementations, a suitable agent "must" have the characteristics that are specified (e.g., "Required") by the node. "Preferred" characteristics of the node are then used to prioritize use of available agents that possess the greatest number of preferred characteristics over those agents lacking preferred characteristics. An example message format for the Second Agent API call is: Source=Node, Command=SecondAgent. When the dispatcher 211 is able to authenticate the requesting node and is able to find an available agent that fulfills the requirements of the Node, then the following response may be sent to the Node: ACK, AgentID=iiiiiiiiiiiiii, IP=xxx.xx.xx.xxx, Name=nnnnnnnnn. If the Node is not authenticated or a suitable Agent is not available, then the Node responds with the following response: NAK/Example Message: Source=Node, Command-SecondAgent/Response: ACK, AgentID=Agent0002, IP=100.88.101.126, Name="Sandra Johnson."

An example "Available" API call is made from an agent (e.g., remote personnel 201) to the dispatcher 211. This command informs the dispatcher 211 that the agent is now available to provide remote service device 230 with remote agent services. The dispatcher 211 simply logs the date/time of the event, stores the IP_address of the Agent, and inserts the agent into the tail of an available agents queue. If the agent ID/PW does not authenticate, then this service responds with a NAK response. An example message format for the Available API call is: Source=Agent, Command=Available, AgentID=iiiiiiiiiii, PW=pppp and an example response format is: ACK=command successfully executed by Dispatcher/NAK=error occurred in processing the request.

An example "Unavailable" API call is made from the agent (e.g., remote personnel 201) to the dispatcher 211. This command informs the dispatcher 211 that the agent is no longer available to provide remote service device 230 with remote agent services. The dispatcher 211 simply logs the date/time of the event and removes the agent from the Available Agents queue. If the Agent ID does not authenticate, then this service responds with an NAK response. An example message format for the Unavailable API call is: Source=Agent, Command=Unavailable, AgentID-iiiiiiiiiii.

An example response format for the Unavailable API call is: ACK=command successfully executed by Dispatcher/ NAK=error occurred in processing the request.

The remote system 210 may incorporate use of "Heartbeat" messages that it periodically sends to the dispatcher 211. These messages allow the dispatcher 211 to determine when a particular agent of the remote system 210 is no longer available. Such might occur because a general communication line outage or perhaps due to a general power failure occurring at a particular agent remote system location. If the dispatcher 211 fails to receive a "Heartbeat" message from an agent of the remote system 210 that is registered as "Available" within a defined timeframe (e.g., 15 seconds) then the dispatcher 211 changes its recorded state of that particular agent of the remote system 210 to "Unavailable".

In some instances, the dispatcher 211 solution includes a class library of routines that are used to automate client calls to the dispatcher 211 by the node (e.g., remote service device 230) and the agent (remote personnel 201). Each call will return an int return-code where zero (0) signals success and negative one (−1) signals an error. Examples follow:

int rc;
string AgentID, NodeID, AgentName, PassWord;
IPAddress AgentIP;
rc=Dispatcher.ServiceActive (NodeID);
rc=Dispatcher.ServiceInac. NodeID);
rc=Dispatcher.AcquireAgent(ref AgentID, ref AgentIP, ref AgentName);
rc=Dispatcher.ReleaseAgent( );
rc=Dispatcher.CancelAgent( );
rc=Dispatcher.SecondAgent(ref AgentID, ref AgentIP, ref AgentName);
rc=Dispatcher.Available(AgentID, PassWord);
rc=Dispatcher.Unavailable (AgentID, PassWord);

The computing environment 200, in some instances, uses one or more process flows to guide its operation and the interaction of the remote service device 230 (a "Node" system), the agent (e.g., the remote personnel 201 operating on the remote system 210) and the dispatcher 211 systems.

Figure 5:
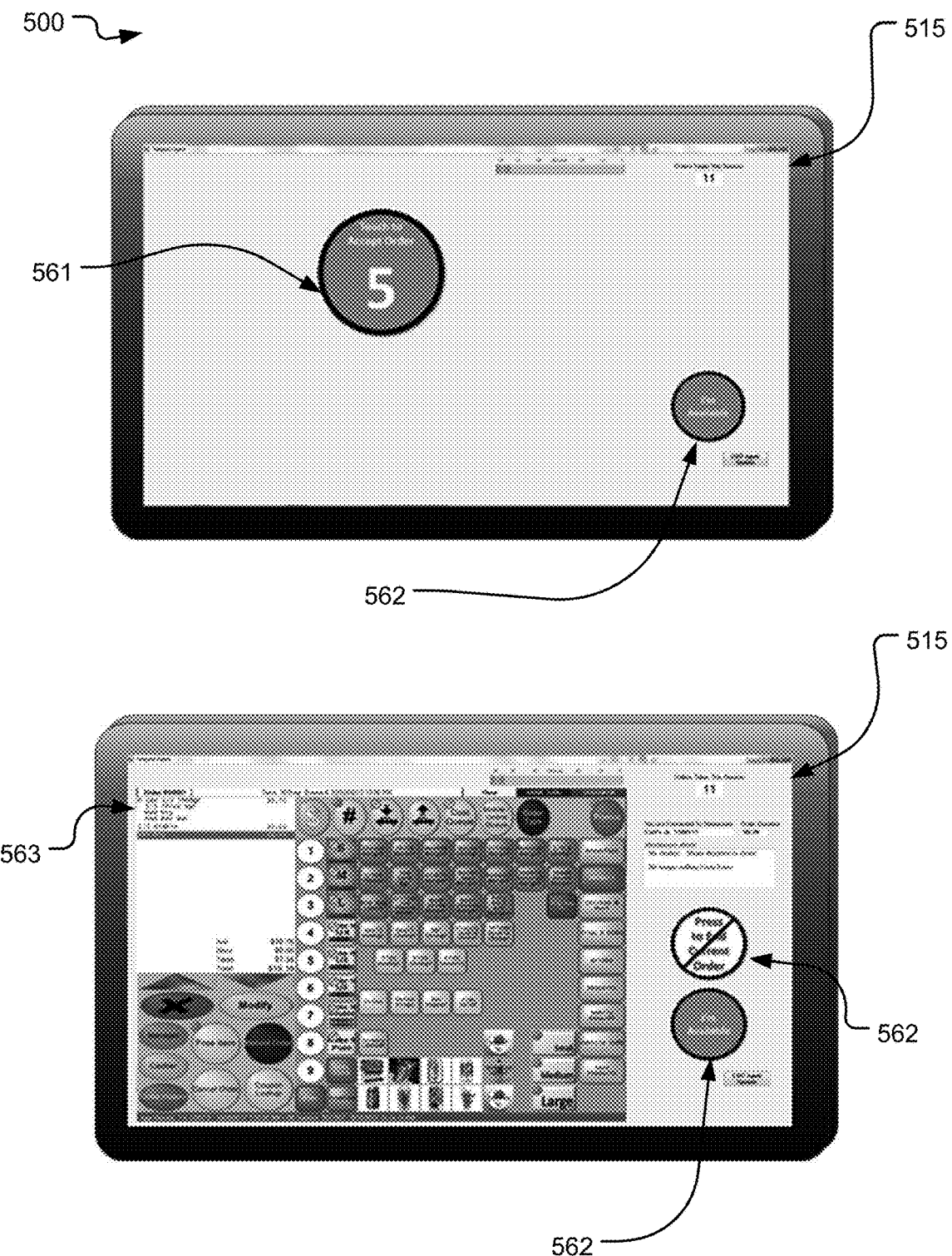
FIG. 5 illustrates a user interface of a remote system.

For example, in a system activation process, at a first step, an operator of the remote service device 230 interacts with (e.g., touches, clicks) a first user interface object (e.g., a red "Remote Ordering is Not Active" button. FIG. 5 user interface object 562 provides an example illustration) on a user interface 235 of the remote service device 230. The operator (e.g., a restaurant manager) is first asked to confirm that they are requesting orders be taken by remote agents. If confirmed, the user interface object toggles to another color (e.g., changed from red to green) and displays new text (e.g., now displays "Remote Ordering is Active"). Responsive to selection of the user interface object, drive-through orders are processed by remote agents with the next drive-through order. At a second step of the system activation process, the dispatcher 211 logs the event that occurred at the first step and processes all future order requests until the restaurant "deactivates remote order taking processes via the remote service device 230.

In a system activation by agent process, the dispatcher 211 logs an event and enters the agent to the end of the "Available Agents" queue so that work can be dispatched to them as required. In a second step of the system activation by agent process, the agent interacts with a "I'm Not Available" user interface object to toggle its state to "I'm Available" on the user interface 235. Responsive to selection of the user interface object, the agent is inserted to the end of the queue of available remote order-takers.

In a service deactivation process, at a first step, an operator of the remote service device 230 interacts with (e.g., touches, clicks) a user interface object (e.g., a "Remote Ordering is Active" button) on the user interface 235 of the remote service device 230. In some implementations, the operator (e.g., a restaurant manager) is first asked for confirmation that they are requesting remote order-taking be discontinued. In some implementations, responsive to receiving a selection of a user interface object indicating the confirmation, all drive-through orders are locally processed by restaurant personnel with the next drive-through order. The selected user interface object, in some implementation, toggles to display "Remote Ordering is Not Active." In a second step of the service deactivation process flow, the dispatcher 211 logs the event and discontinues processing any order requests from the store until the restaurant reactivates remote order taking at the remote service device 230 location.

In a service deactivation process, at a first step, the agent interacts with (e.g., touches, clicks, etc.) an "I'm Available" user interface object on the user interface 215 to toggle its state to display "I'm Not Available". An agent screen returns to initial state and the dispatcher logs the event and removes the agent from the "Available Agents" queue. The event is logged and stats are updated. Alternatively, the agent may interact with an "EXIT" user interface object. If so, and if the agent was "I'm Available," then the dispatcher 211 logs the event and removes the agent from the "Available Agents" queue. The event is logged and stats are updated, and the agent may exit the system entirely by clicking an "EXIT" user interface object.

In a remote order initiation process, at a first step, a drive through loop signals arrival of customer 202 at a drive-through location. If the restaurant manager has activated remote order taking via the remote service device 230, a signal is sent to the dispatcher 211 site to connect remote service device 230 with the agent. At a second step, the dispatcher identifies the next available agent (e.g., remote personnel 201) from the queue that is qualified to take orders for a particular brand of POS system or merchant. The dispatcher 211 sends to the remote service device 230 a message to with an IP address of the available agent. At a third step, remote service device 230 sends a message to the agent and awaits their confirmation that they accept the order. At a fourth step, the remote system 210 notifies (e.g., via visual output or via audio output such as one or more beeps) to notify the agent of a new order requiring service. In some implementations, the agent must press an on-screen "Confirm" user interface object on the user interface 215 within a predefined amount of time (e.g., within 5 seconds) to accept the order. At a fifth step, if the agent confirms acceptance of order within the predefined amount of time, then the process proceeds to a sixth step described below. Otherwise, the agent declined the order by not confirming within the predefined amount of time. If this was the first time the agent declined the order, then the remote system 210 sends the dispatcher 211 a message that the agent was not available and proceeds to a sixth step described below. Else, if the agent declined the order two or more times, then the process proceeds to an eighth step described below. At a sixth step, the dispatcher 211 removes former Agent from the "Available" queue And the dispatcher 211 returns to the second step described above. At a seventh step, the remote system 210 sends the agent station (e.g., an agent station of the agent at the remote system 210) an "Order Start" message including an alert tag that informs the agent of timely important info (e.g., "No Shakes today"). In some implementations, in an eighth step, the remote service device 230 enters the "Remote Ordering is Not Active" mode and delivers a verbal message to store personnel that store must manually take order.

In an example remote order end process, at a first step, if point of sale system 250 loop indicates that a customer departed, the remote order system 210 sends the dispatcher a message confirming that the order ended. At a second step, the dispatcher 211 notifies the agent station of the order end, moves the agent to end of queue and performs statistical analysis and cleanup operations. At a third step, the agent station (e.g., at the remote system 210) is notified of "Order End" and the agent station returns to the "waiting for Order" state.

In an example premature cancellation by agent process, at a first step, if an order entry is canceled (e.g., status of order entry set to "Cancelled") by the agent, the agent notifies the dispatcher 211 via a message. At a second step, the agent facility is placed in an agent status of "Not Available." At a third step, the dispatcher 211 notifies the remote service device 230 that the agent is not completing the order. The dispatcher 211 changes the state of the agent to "Unavailable". At a fourth step, the remote service device 230 notifies (e.g., via an audio output) the merchant location that merchant personnel must complete the order abandoned by the agent (e.g., using the merchant's POS system 150).

Figure 3:
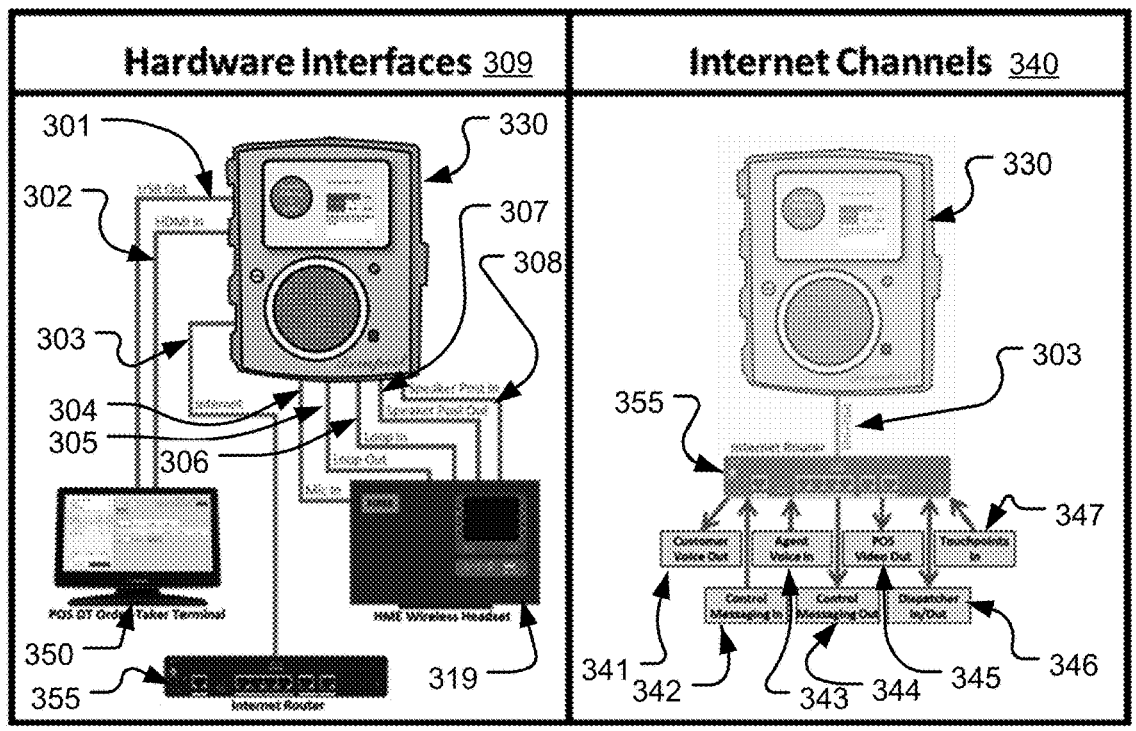
FIG. 3 illustrates an example remote service device that includes hardware interfaces and network communication channels.

FIG. 3 illustrates an example remote service device 330 that includes hardware interfaces and network communication channels. In some instances, the remote service device 330 includes interfaces that it manages in an asynchronous manner using somewhat complex program threads and event-based programming. In all, the remote service device 330 interfaces with a number of different external hardware interfaces (e.g., eight hardware interfaces 309) and a number of network communication channels (e.g., seven internet channels 340) transporting data. For example, hardware interfaces 309 may include a USB output hardware interface 301, a video input (e.g. HDMI or another video type input such as VGA or DVI) hardware interface 302, an internet hardware interface 303, a microphone input hardware interface 304, a loop output hardware interface 305, a loop in hardware interface 306, a speaker post output hardware interface 307, and a speaker post input hardware interface 308. Internet channels 340 may include a customer voice out cannel 341, a control messaging in channel 342, an agent voice in channel 343, a control messaging out channel 344, a POS device video out channel 345, a dispatcher in/out channel 346, and a touchpoints in channel 347. In some implementations, the hardware interfaces 304, 305, 306, 307, and 308 connect the remote service device 330 with a wireless headset device 319 of the POS system. In some implementations, hardware interfaces 301 and 302 connect the remote service device 330 with a POS terminal 350 of the POS system. In some implementations, the hardware interface 303 connects the remote service device 330 with an internet router 355, which facilitates network connection to the remote ordering system.

Figure 4:
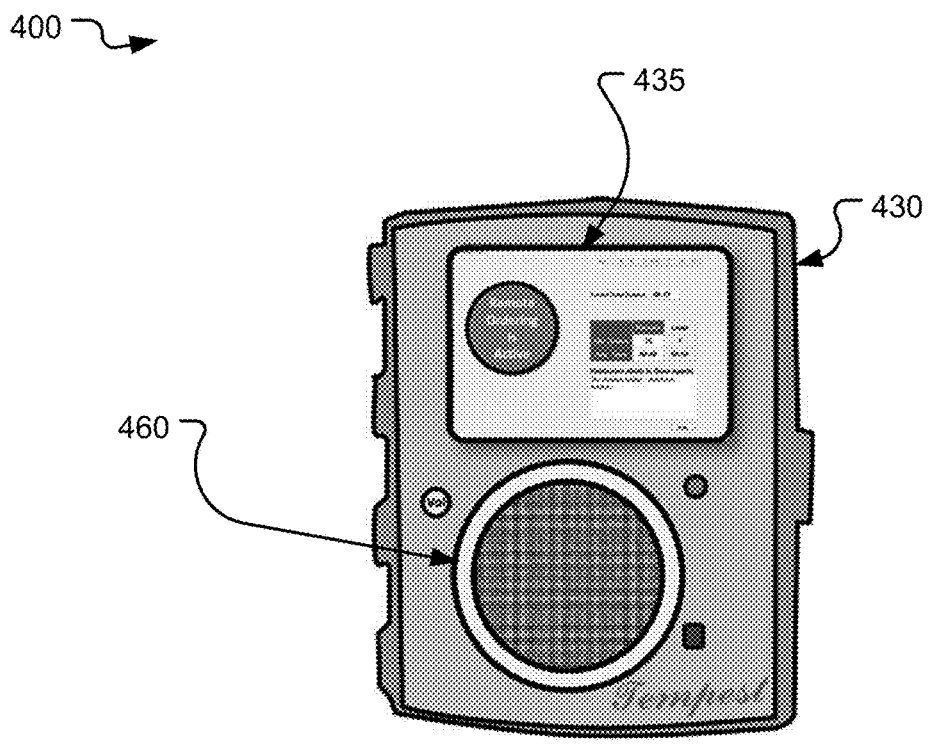
FIG. 4 illustrates an example remote service device.

FIG. 4 illustrates an example 400 of a remote service device 430. The example remote service device 430 includes a user interface 435. In some implementations, the remote service device 430 device includes a speaker component 460 for outputting information to one or more personnel at a location of the remote service device 430. For example, if an agent is not available to take an order, the remote service device 430 may output, via the speaker component 460, an indication that the personnel at the location must take the order via the local POS system instead of a remote agent handling the order.

FIG. 5 illustrates an example 500 of a user interface 515 of a remote system. In some implementations, the remote system includes a PC associated with remote personnel that includes an agent component that performs remote order-taking for one or more merchant systems. For example, when a customer arrives in the restaurant drive-through, the remote system (e.g., the dispatcher) identifies a remote personnel to service the customer. For example, the remote personnel is available, as indicated by the user interface object 562 (e.g., which reads "I'm Available"). The remote personnel may be notified that a customer requires service by beeping and presenting an on-screen countdown timer interface object 561 (e.g., countdown timer button that reads "Touch to Accept Offer" and indicates a time limit of 5 seconds to accept the order. The remote personnel then has a predefined amount of time (e.g., 5 seconds, or other predefined amount of time) to "mouse click" or touch the countdown timer button to accept the order. If not accepted within the predefined time period, the remote system (e.g., the dispatcher) will identify an alternative remote personnel for service. The user interface 515 may instead be configured to automatically accept an incoming order when the agent is "Available" (e.g., when the user interface object 562 reads "I'm Available"). In this case, under interface 515 may simply notify the agent that an order request has arrived by presenting an audible beep to the agent.

As indicated in FIG. 5, responsive to receiving a selection of the countdown timer user interface object 561, to accept the order, or responsive to a configuration in which incoming order requests are automatically accepted, the user interface 515 displays an ordering interface 563 of a POS device (e.g., POS terminal) at the merchant location. The remote personnel enters ordered items in the presented POS device screen presented via the user interface 515. Remote personnel will typically use a headset to converse with the customer at the restaurant drive-through.

Figure 6:
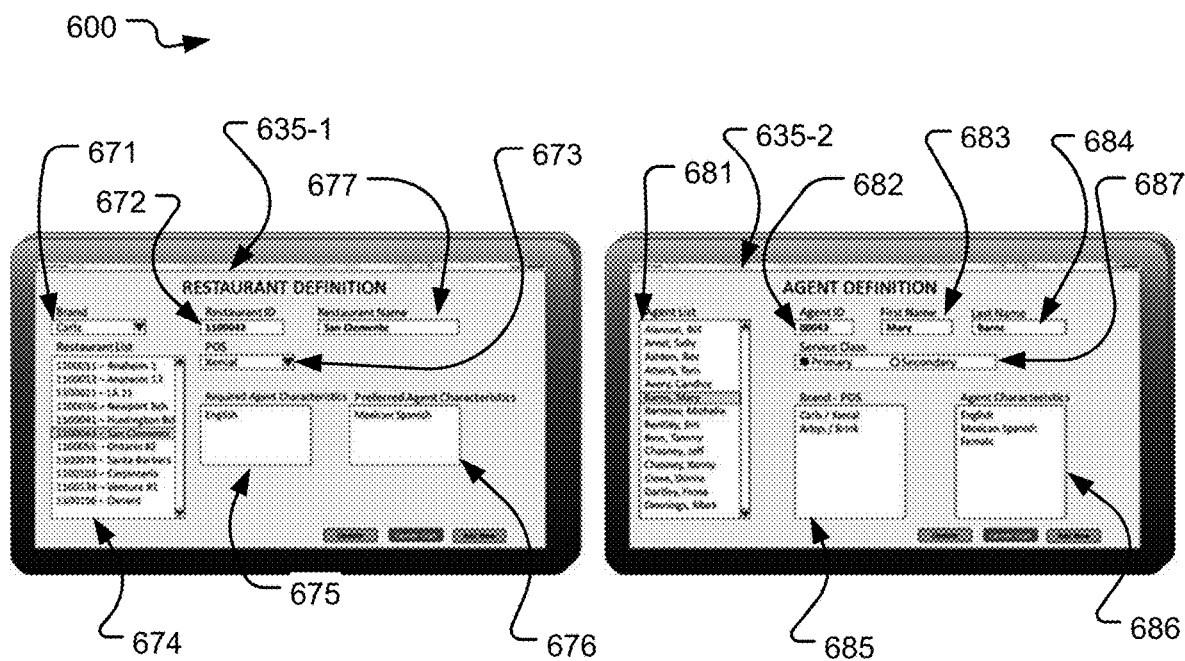
FIG. 6 illustrates an example user interface of a remote system displaying an administration application.

FIG. 6 illustrates example user interfaces 600 of a remote system displaying an administration application. The administration application screens (e.g., screen 635-1, and screen 635-2) may provide a simple interface such as the following to permit user maintenance. For example, screen 635-1 displays a restaurant definition interface including user interface object 671 (e.g., a dropdown menu) for selecting a brand, a user interface object 674 (e.g. a dropdown menu) for selecting a restaurant, user interface object 672 (e.g., a text field) for displaying a restaurant ID of a selected restaurant, a user interface object 677 (e.g., a text field) for displaying a selected restaurant name, a user interface object 673 (e.g., a dropdown menu) for selecting a POS device identifier, a user interface object 675 (e.g., a text field) for displaying required agent characteristics, and a user interface object 676 (e.g., a text field) for displaying preferred agent characteristics.

For example, screen 635-2 displays an agent definition interface including user interface object 681 (e.g., a dropdown menu) for selecting an agent from an agent list, a user interface object 682 (e.g., a text field) for displaying an agent ID of a selected agent, a user interface object 683 (e.g., a text field) for displaying a first name of a selected agent, a user interface object 684 (e.g., a text field) for displaying a last name of a selected agent, a user interface object 687 for displaying a service class (e.g., "primary" option is selected and "secondary" option is not selected), a user interface object 685 (e.g., a text field) for displaying a POS device brand associated with the selected agent, and a user interface object 683 (e.g., a text field) for displaying a first name of a selected agent, and a user interface object 686 (e.g., a text field) for displaying a agent characteristics of a selected agent.

FIG. 7 illustrates example operations 700 for remote order taking. The example operations 700 include an example providing operation 702 and an example entering operation 704.

The example providing operation 702 provides, to a remote ordering system via a network, access to one or more subsystems of a client computing system using a remote service device, the remote service device being communicatively coupled to the one or more subsystems at the location via corresponding hardware interface channels.

In some implementations, the subsystems include a user interface of a computing device (e.g., a point-of-sale terminal, a kitchen display system, an order confirmation board, an order post, or another computing device). In these implementations, providing access includes receiving, via a display hardware interface channel of the hardware interface channels, display data of the user interface and transmitting, via the network to the remote ordering system, display data of the user interface.

In some implementations, the subsystems include an order post and providing access includes receiving, via an audio hardware interface channel of the hardware interface channels, audio of a customer input at the order post and transmitting, via the network to the remote ordering system, the audio of the customer.

In some implementations, providing access includes transmitting, via the network, a request to a dispatcher system for an identity of an available agent computing device. In these implementations, providing the access also includes providing the access to the available agent computing device corresponding to an agent computing device identifier received from the dispatcher system The example entering operation 704 communicates, using the remote service device to the client computing system via one or more of the hardware interface channels, a command received from the remote ordering system. In some implementations, the command is received from an available agent computing device to which the remote access device provided access to the subsystems of the client computing system. In some implementations, the command includes an interaction with the user interface of a computing device (e.g., a point-of-sale terminal, a kitchen display system, an order confirmation board, an order post, or another computing device), and communicating the command includes communicating the command to the computing device via the display hardware interface channel.

In some implementations, the command includes audio of an agent of the remote ordering system, and communicating the command includes communicating the audio to the order post via an audio hardware interface channel. In some implementations, the audio hardware interface channel connects the remote service device to a headset device and the headset receives the audio input at the order post via a second hardware interface channel. In these implementations, communicating the audio to the order post includes communicating the audio to the headset device via the audio hardware interface channel and the headset device forwards the audio to the order post via the second hardware interface channel.

Figure 8:
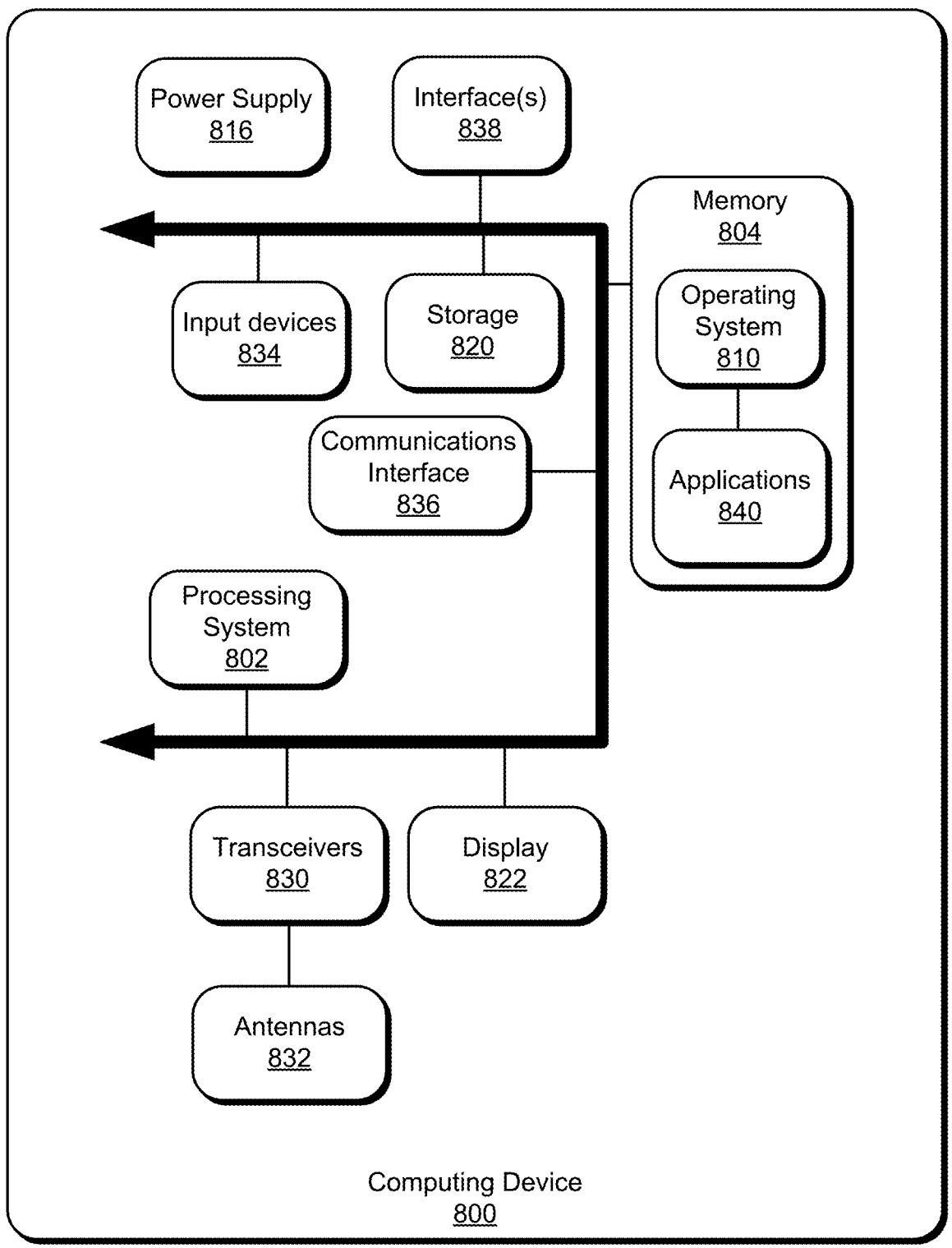
FIG. 8 illustrates an example computing device for use in implementing the described technology.

FIG. 8 illustrates an example computing device 800 for use in implementing the described technology. The computing device 800 may be a client computing device (such as a laptop computer, a desktop computer, or a tablet computer), a server/cloud computing device, an Internet-of-Things (IoT), any other type of computing device, or a combination of these options. The computing device 800 includes one or more hardware processor(s) 802 and a memory 804. The memory 804 generally includes both volatile memory (e.g., RAM) and nonvolatile memory (e.g., flash memory), although one or the other type of memory may be omitted. An operating system 810 resides in the memory 804 and is executed by the processor(s) 802. In some implementations, the computing device 800 includes and/or is communicatively coupled to storage 820.

In the example computing device 800, as shown in FIG. 8, one or more software modules, segments, and/or processors, such as a remote service device, a remote system, a point of sale system (including one or more POS devices), a KDS, an OCB, an OP, a dispatcher, a communication interface, one or more computing devices of a remote system operated by remote personnel, applications 840, and other program code and modules are loaded into the operating system 810 on the memory 804 and/or the storage 820 and executed by the processor(s) 802. The storage 820 may store control data (e.g., programming code) and other data and be local to the computing device 800 or may be remote and communicatively connected to the computing device 800. In one implementation, components of a system for classifying a dataset may be implemented entirely in hardware or in a combination of hardware circuitry and software.

The computing device 800 includes a power supply 816, which may include or be connected to one or more batteries or other power sources, and which provides power to other components of the computing device 800. The power supply 816 may also be connected to an external power source that overrides or recharges the built-in batteries or other power sources.

The computing device 800 may include one or more communication transceivers 830, which may be connected to one or more antenna(s) 832 to provide network connectivity (e.g., mobile phone network, Wi-Fi®, Bluetooth®) to one or more other servers, client devices, IoT devices, and other computing and communications devices. The computing device 800 may further include a communications interface 836 (such as a network adapter or an I/O port, which are types of communication devices). The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard, trackpad, or mouse). These and other input devices may be coupled to the server by one or more interfaces 838, such as a serial port interface, parallel port, or universal serial bus (USB). The computing device 800 may further include a display 822, such as a touchscreen display.

The computing device 800 may include a variety of tangible processor-readable storage media and intangible processor-readable communication signals. Tangible processor-readable storage can be embodied by any available media that can be accessed by the computing device 300 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method for remote order taking at a location, comprising: providing, to a remote ordering system via a network, access to subsystems of a client computing system using a remote service device, the remote service device being communicatively coupled to the subsystems at the location via corresponding hardware interface channels; and communicating, using the remote service device to the client computing system via one or more of the hardware interface channels, a command received from the remote ordering system.

Clause 2. The method of clause 1, wherein the subsystems include a user interface of a computing device, wherein providing access includes: receiving, via a display hardware interface channel of the hardware interface channels, display data of the user interface; and transmitting, via the network to the remote ordering system, display data of the user interface.

Clause 3. The method of clause 2, wherein the command includes an interaction with the user interface, and wherein communicating the command includes communicating the command to the computing device via the display hardware interface channel.

Clause 4. The method of clause 2, wherein the computing device is a point-of-sale terminal.

Clause 5. The method of clause 2, wherein the computing device is a kitchen display system, an order confirmation board, or an order post.

Clause 6. The method of clause 1, wherein the subsystems include an order post, wherein the hardware interface channels include an audio hardware interface channel, and wherein providing access includes: receiving, via the audio hardware interface channel, audio of a customer input at the order post; and transmitting, via the network to the remote ordering system, the audio of the customer.

Clause 7. The method of clause 6, wherein the command includes audio of an agent of the remote ordering system, and wherein communicating the command includes communicating the audio to the order post via the audio hardware interface channel.

Clause 8. The method of clause 7, wherein the audio hardware interface channel connects the remote service device to a headset device, wherein the headset device receives the audio input at the order post via a second hardware interface channel, wherein communicating the audio to the order post includes communicating the audio to the headset device via the audio hardware interface channel, the headset device forwarding the audio to the order post via the second hardware interface channel.

Clause 9. The method of clause 1, wherein providing access includes: transmitting, via the network, a request to a dispatcher system for an identity of an available agent computing device; and providing, via the network, the access to the available agent computing device corresponding to an agent computing device identifier received from the dispatcher system.

Clause 10. The method of clause 9, wherein the command is received from the available agent computing device.

Clause 11. One or more tangible processor-readable storage media embodied with instructions for executing on one or more processors and circuits of a system a process for remote order taking at a location, the process comprising: providing, to a remote ordering system via a network, access to one or more subsystems of a client computing system using a remote service device, the remote service device being communicatively coupled to the one or more subsystems at the location via hardware interface channels; and communicating, using the remote service device to the client computing system via one or more of the hardware interface channels, a command received from the remote ordering system.

Clause 12. A system for remote order taking at a location, the remote service device comprising: one or more hardware processors; hardware interface channels communicatively coupled to one or more subsystems of a client computing system at a location; a client communication interface executable by the one or more hardware processors and configured to receive data of the one or more subsystems via the hardware interface channels; and a remote communication interface executable by the one or more hardware processors and configured to: provide, to a remote ordering system via a network, access to data of the one or more subsystems received via the hardware interface channels; and receive, from the remote ordering system via the network, a command, the client communication interface further configured to communicate, to the client computing system via one or more of the hardware interface channels, the command.

Clause 13. The system of clause 12, the subsystems including a user interface of a computing device, the hardware interface channels including a display hardware interface channel communicatively coupled to the computing device, wherein the client communication interface is further configured to receive, from the computing device via the display hardware interface channel, display data of the user interface, and wherein the remote communication interface is further configured to transmit, to the remote ordering system via the network, the display data.

Clause 14. The system of clause 13, wherein the command includes an interaction with the user interface, and wherein the client communication interface is further configured to: communicate the command to the computing device via the display hardware interface channel.

Clause 15. The system of clause 14, wherein the computing device is a point-of-sale terminal.

Clause 16. The system of clause 14, wherein the computing device is a kitchen display system, an order confirmation board, or an order post.

Clause 17. The system of clause 13, the subsystems including an order post, the hardware interface channels including an audio hardware interface channel communicatively coupled to the order post, wherein the client communication interface is further configured to receive, from the order post via the audio hardware interface channel, audio of a customer input at the order post, and wherein the remote communication interface is further configured to transmit, to the remote ordering system via the network, the audio of the customer.

Clause 18. The system of clause 17, wherein the command includes audio of an agent of the remote ordering system, and wherein the client communication interface is further configured to communicate the audio of the agent to the order post via the audio hardware interface channel.

Clause 19. The system of clause 18, wherein the audio hardware interface channel connects the remote service device to a headset device, wherein the headset receives the audio input at the order post via a second hardware interface channel, wherein communicating the audio to the order post includes communicating the audio to the headset device via the audio hardware interface, the headset device forwarding the audio to the order post via the second hardware interface channel.

Clause 20. The system of clause 13, wherein the remote communication interface is further configured to: transmit, via the network, a request to a dispatcher system for an identity of an available agent computing device; and provide, via the network, the access to the available agent computing device corresponding to an agent computing device identifier received from the dispatcher system.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, programming code, code segments, programming code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for managing communications for remote order taking, comprising:
   communicatively connecting a remote service computing device at a client location to a remote ordering computing device at a remote order taking location via an internet network;
   locally connecting the remote service computing device to a point of sale computing device at the client location one or more peripheral hardware interfaces;
   forwarding, via the remote service computing device, display data of a user interface of the point of sale computing device received via the one or more peripheral hardware interfaces to the remote ordering computing device via the internet network;
   receiving, via the remote service computing device from the remote ordering computing device via the internet network, a request for an interaction with the user interface of the point of sale computing device responsive to input received at the remote ordering computing device; and
   instructing, via the remote service computing device, the interaction with the user interface of the point of sale computing device by transmitting a command to the point of sale computing device via the one or more peripheral hardware interfaces, the interaction with the user interface of the point of sale computing device causing generation of order data by the point of sale computing device.

2. The method of claim 1, wherein the point of sale computing device is a point-of-sale terminal.

3. The method of claim 1, wherein the point of sale computing device is communicatively connected to a point of sale computing system that includes one or more of a kitchen display device, an order confirmation board, or an order post.

4. The method of claim 1, wherein the point of sale computing device is communicatively connected to a point of sale system that includes an order post, the method further comprising:
   locally connecting the remote service computing device to the order post via an audio peripheral hardware interface;
   receiving via the remote service computing device via the audio peripheral hardware interface, audio of a customer captured at the order post; and
   forwarding, via the remote service computing device via the internet network to the remote ordering computing device, the audio of the customer.

5. The method of claim 4, further comprising:
   receiving, by the remote service computing device from the remote ordering computing device via the internet network, audio of an agent input at a remote ordering terminal of the remote ordering computing device; and forwarding, by the remote service computing device to the order post via the audio peripheral hardware interface, the audio of the agent.

6. The method of claim 5, wherein the audio peripheral hardware interface connects the remote service computing device to a headset device of the order post, wherein the headset device receives captures the audio of the customer.

7. The method of claim 1, further comprising:
communicatively connecting the remote service computing device to a dispatcher system via the internet network;
transmitting, by the remote service computing device to the dispatcher system via the internet network, a request for an agent computing device; and
receiving, by the remote service computing device from the dispatcher system via the internet network, an identifier corresponding to an available agent computing device, wherein the remote ordering computing device is the available agent computing device corresponding to the identifier.

8. One or more non-transitory processor-readable storage media embodied with instructions for executing on one or more processors and circuits of a remote service computing device at a client location a process for managing communications for remote order taking, the remote service computing device being locally connected to a point of sale computing device at the client location via one or more peripheral hardware interfaces, the remote service computing device being communicatively connected to a remote ordering computing device at a remote order taking location via an internet network, the process comprising:
forwarding display data of a user interface of the point of sale computing device received via the one or more peripheral hardware interfaces to the remote ordering computing device at the remote order taking location via the internet network;
receiving, from the remote ordering computing device via the internet network, a request for an interaction with the user interface of the point of sale computing device responsive to input received at the remote ordering computing device; and
instructing an interaction with the user interface of the point of sale computing device by transmitting a command to the point of sale computing device via the one or more peripheral hardware interfaces, the interaction with the user interface causing generation of order data by the point of sale computing device.

9. The one or more non-transitory processor-readable storage media of claim 8, wherein the point of sale computing device is a point-of-sale terminal.

10. The one or more non-transitory processor-readable storage media of claim 8, wherein the point of sale computing device is communicatively connected to a point of sale computing system that includes one or more of a kitchen display device, an order confirmation board, or an order post.

11. The one or more non-transitory processor-readable storage media of claim 8, wherein the point of sale computing device is communicatively connected to a point of sale system that includes an order post, the process further comprising:
locally connecting the remote service computing device to the order post via an audio peripheral hardware interface;
receiving, via the audio peripheral hardware interface, audio of a customer captured at the order post; and
forwarding, via the remote service computing device and via the internet network to the remote ordering computing device, the audio of the customer.

12. The one or more non-transitory processor-readable storage media of claim 11, the process further comprising:
receiving, from the remote ordering computing device via the internet network, audio of an agent input at a remote ordering terminal of the remote ordering computing device; and
forwarding, to the order post via the audio peripheral hardware interface, the audio of the agent.

13. The one or more non-transitory processor-readable storage media of claim 12, wherein the audio peripheral hardware interface locally connects the remote service computing device to a headset device of the order post, wherein the headset device receives the audio of the customer.

14. A remote service computing device at a client location for managing communications for remote order taking, the remote service computing device comprising:
one or more hardware processors;
a client communication interface executable by the one or more hardware processors and configured to:
locally connect the remote service computing device to a point of sale computing device at the client location via one or more peripheral hardware interfaces; and
receive display data of a user interface of the point of sale computing device via the one or more peripheral hardware interfaces;
a remote communication interface executable by the one or more hardware processors and configured to:
communicatively connect the remote service computing device to a remote ordering computing device at a remote order taking location via an internet network;
forward the display data of the user interface to the remote ordering computing device via the internet network; and
receive, from the remote ordering computing device via the internet network, a request for an interaction with the user interface of the point of sale computing device responsive to input received at the remote ordering computing device; and
the client communication interface further configured to instruct the interaction with the user interface of the point of sale computing device by transmitting a command to the point of sale computing device via the one or more peripheral hardware interfaces, the interaction with the user interface of the point of sale computing device causing generation of order data by the point of sale computing device.

15. The remote service computing device of claim 14, wherein the point of sale computing device is a point-of-sale terminal.

16. The remote service computing device of claim 14, wherein the point of sale computing device is communicatively connected to a point of sale computing system that includes one or more of a kitchen display system, an order confirmation board, or an order post.

17. The remote service computing device of claim 14, wherein the point of sale computing device is communicatively connected to a point of sale system that includes an order post,
wherein the client communication interface further is configured to:
locally connect the remote service computing device to the order post via an audio peripheral hardware interface; and receive, via the audio peripheral hardware interface, audio of a customer captured at the order post, wherein the remote communication interface is further configured to transmit, to the remote ordering computing device over the internet network, the audio of the customer.

18. The remote service computing device of claim 17, wherein the remote communication interface is further configured to receive from the remote ordering computing device via the internet network, audio of an agent input at a remote ordering terminal of the remote ordering computing device, wherein the client communication interface is further configured to transmit, to the order post via the audio peripheral hardware interface, the audio of the agent received from the remote ordering computing device.

19. The remote service computing device of claim 18, wherein the audio peripheral hardware interface connects the remote service computing device to a headset device of the order post, wherein the headset device receives the audio of the customer.

20. The remote service computing device of claim 14, wherein the remote communication interface is further configured to:
- communicatively connect the remote service computing device to a dispatcher system via the internet network;
- transmit, to the dispatcher system via the internet network, a request for an agent computing device; and
- receive, from the dispatcher system via the internet network, an identifier corresponding to an available agent computing device, wherein the remote ordering computing device is the available agent computing device.

* * * * *